United States Patent [19]

Cameron

[11] Patent Number: 4,690,222
[45] Date of Patent: Sep. 1, 1987

[54] HORSE SHOE

[76] Inventor: Kenneth A. Cameron, 8702 Meadow Rd., Downey, Calif. 90242

[21] Appl. No.: 813,946

[22] Filed: Dec. 27, 1985

[51] Int. Cl.⁴ .............................................. A01L 5/00
[52] U.S. Cl. .................................. 168/4; 168/DIG. 1
[58] Field of Search .................. 168/4, 17, 20, DIG. 1

[56] References Cited

U.S. PATENT DOCUMENTS 2,024,265  12/1935  Anderson et al. .................... 168/4
3,302,723  2/1967   Renkenberger et al. ............. 168/4
3,494,422  2/1970   Clark ........................ 168/DIG. 1 X
4,205,726  6/1980   Spencer .................................. 168/4
4,206,811  6/1980   Dallmer .................................. 168/4

Primary Examiner—Robert P. Swiatek
Attorney, Agent, or Firm—Cislo & Thomas

[57] ABSTRACT

A nailless horse shoe comprising a resilient material is disclosed. The horse shoe comprises a curved body, an upwardly projecting tab and downwardly depending projections and gripper. Additional strength is provided by use of a curved member embedded in the body having a high strength to weight ratio.

8 Claims, 5 Drawing Figures

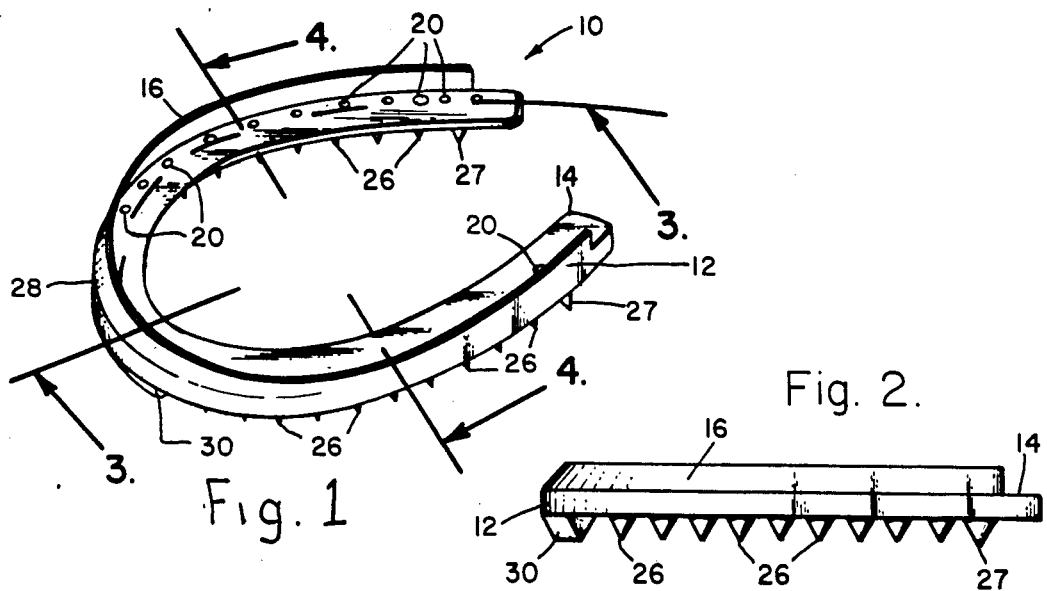
Fig. 1
Fig. 2
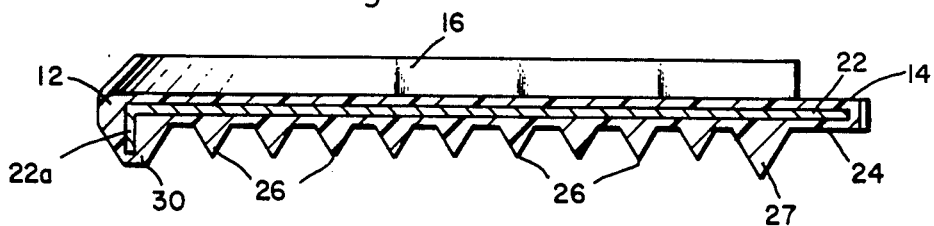
Fig. 3
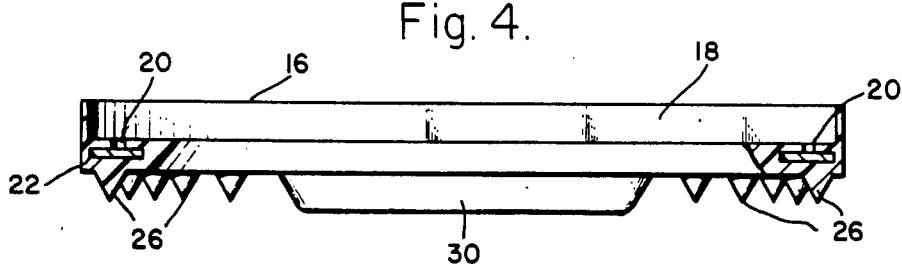
Fig. 4
Fig. 5
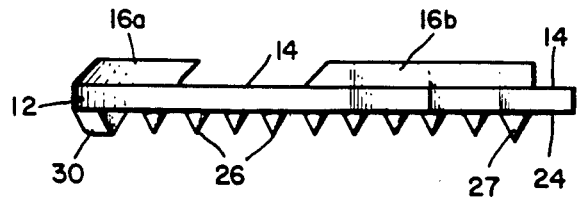

HORSE SHOE

BACKGROUND OF THE INVENTION

This invention relates in general to a horse shoe, and, more particularly, to a resiliently flexible horse shoe capable of absorbing severe shocks and preventing lacerations to the horse, other horses or to riders.

Persons familiar with the handling of horses, particularly horses used in racing and the like, have long been aware of the need for a better horse shoe. It is well-known that the legs of horses, and particularly their ankles, tendons, knees and shoulders, are frequently injured by the shocks incurred from impact of their hooves with relatively hard surfaces, especially during competition.

Another serious problem created by existing horse shoes involves the painful and crippling lacerations often produced in one leg of a horse by the edge of a horse shoe on the hoof of another leg.

Resilient horse shoes are known; see e.g., U.S. Pat. Nos. 152,975, 3,302,723, 1,946,636, 3,513,915, 3,050,133 and 586,558. These horse shoes all suffer various difficulties which render them unsuitable for use with racing horses. For example, some of the horse shoes require nails for attachment, which introduces the possibility of accidental nailing injuries. Other horse shoes do not adequately protect the hoof; an unprotected hoof may inflict a horse's legs with bruises, cuts and contusions during the course of a horse race.

Thus, there remains a need for a light weight, resilient horse shoe which can stand up to the rigors brought on by racing competition.

OBJECTS AND SUMMARY OF THE INVENTION

Accordingly, it is an object of the present invention to provide a nailless horse shoe.

It is a further object of the invention to provide a nailless horse shoe suitable for use in racing and provided with a protection of the outside edge of the hoof.

It is yet another object of the present invention to provide a racing horse shoe having resiliency for absorbing shocks and reducing damage to the horse and to other horses.

It is a still further object of the present invention to provide a light weight, resilient horse shoe having the strength to withstand the rigors of racing competition.

These and further objects of the invention will become more apparent upon a consideration of the following commentary taken in conjunction with the appended drawing.

Briefly, the horse shoe of the invention comprises a resilient curved body having an upper surface adapted to receive a horse's hoof, resilient tab means projecting inwardly and adapted to clampingly engage an outer surface of a horse's hoof and to position the horse shoe on the hoof, the upper surface of the horse shoe and the mating surface of the tab means adapted to receive a bonding means and at least the upper surface being provided with a plurality of cavities for receiving the bonding means, a curved member embedded in the horse shoe comprising material having a high strength to weight ratio, and a lower surface provided with a plurality of downwardly depending projections.

The horse shoe of the invention requires no nailing and therefore eliminates the possibility of accidental nailing injuries. The horse shoe is further equipped with a "lip", or tab means, which fits around the outside of the hoof, and further lessens injuries by protecting the horse's legs. Finally, the use of a resilient material, in which is embedded a curved member having a high strength to weight ratio, provides a horse shoe that is approximately 30% lighter than the metal racing shoes presently in use, thereby providing support while at the same time providing adequate resiliency to protect the horse's legs and the jockey and to cushion the shock of racing.

BRIEF DESCRIPTION OF THE DRAWING

FIG. 1 is a perspective view showing the horse shoe of the invention;

FIG. 2 is a side elevational view of the horse shoe;

FIG. 3 is a cross-sectional view taken along the line 3—3 of FIG. 1;

FIG. 4 is a cross-sectional view taken along the line 4—4 of FIG. 1; and

FIG. 5 is a side elevational view similar to that of FIG. 2 but depicting an alternative embodiment.

DETAILED DESCRIPTION OF THE PREFERRED EMBODIMENTS

Referring now to the drawing wherein like numerals of reference refer to like elements throughout, the horse shoe of the invention is generally depicted at 10. The horse shoe 10 comprises a resilient curved body 12 having an upper surface 14 adapted to receive the bottom of a horse's hoof (not shown). A resilient tab means 16 projects upwardly. The tab means 16 is adapted to clampingly engage an outer surface of a horse's hoof and to aid in positioning the horse shoe 10 on the hoof.

The upper surface 14 of the horse shoe 10 and the inside surface 18 of the tab 16 are adapted to receive a bonding means, such as a suitable epoxy (not shown), for bonding the horse shoe 10 to a horse's hoof. In this connection, at least the upper surface 14 is provided with a series of openings 20, into which epoxy may flow and provide additional holding strength.

For added strength, a curved member 22 is embedded in the body 12 of the horse shoe 10. The openings 20 terminate at the top of the curved member 22, as seen in FIG. 4. The curved member 22 comprises a material having a high strength to weight ratio and may comprise a light weight metal such as aluminum or any of the well-known high strength plastics. The fabrication of an embedded member in a resilient material itself is well-known and hence forms no part of this invention.

The curved body 12 is provided with a lower surface 24 which in turn is provided with a plurality of downwardly depending projections 26 having a conical shape. Further, in the forward region 28 of the horse shoe, a downwardly depending gripper means 30 is provided. The extent of the projections 26 and gripper means 30 is approximately the same, in order to provide stability for the horse. The purpose of the downwardly depending gripper 30 is to provide added stability and grip of the horse's hoof. To provide added support of the gripper means, the curved embedded member 22 may include a downwardly depending portion 22a integrally formed with the member 22.

For improved traction, a pair of rear projections 27 may be made a bit longer than the intermediate projections 26. Also, the gripper means 30 may be of a length intermediate that of projections 26 and 27 to provide three point stability and to tip the hoof slightly forward.

For further reduced weight and ease of fitting the horse shoe 10 onto the hoof of a horse, the middle part of the tab means 16 may be omitted, leaving a forward portion 16a and two rear portions 16b (one of which is seen in side elevational view in FIG. 5).

Preferably, the lip 16, the downwardly depending projections 26 and 27 and downwardly depending gripper 30 are integrally formed with the body 12. The resilient material may comprise any of the natural or synthetic rubbers or hard rubbers, as well as suitable plastics such as polyurethanes and the like.

The use of a horse shoe which requires no nailing eliminates the possibility of accidental nailing injuries. These problems are wide-spread throughout the horse and racing industry and have cost race horse owners millions of dollars. The well-known "Quarter Crack" (a severe crack in the hoof) could be virtually eliminated as well as could many other problems caused by nerve or other tissue injuries to the hoof area incurred during nailing.

The horse shoe of the invention, being equipped with upwardly projecting resilient tab 16, fits around the outside edge of the hoof. This further reduces the possibilities of injuries by protecting the horse's legs, which are often inflicted with bruises, cuts and contusions during the course of a horse race—a brutal experience for an expensive horse.

Use of a resilient material in the horse shoe adds to the protection of the horse's legs in preventing injury to itself or another horse during the course of a horse race. Injuries to jockeys are also expected to be reduced, inasmuch as the resilient horse shoe is likely to cause less bodily harm than hard metal horse shoes. Further, the resilient cushion of the horse shoe lends itself to the reduction of pain and stiffness of the shin and other leg ailments caused by the jarring motion of running.

The horse shoe of the invention is approximately 30% lighter than metal shoes currently in use, and it is conceivable that use of a lighter horse shoe will enable a horse to achieve a faster speed.

The horse shoe of the invention is attached to the hoof of the horse by means of a suitable epoxy. Removal of the horse shoe is done by the use of nippers, which are inserted between the embedded member 22 and the horse's hoof. The small amount of resilient material which remains intact can be easily filed away.

Thus, there has been disclosed a horse shoe comprising a resilient material suitable for use with racing horses and in other forms of competition where it is desired to minimize injury to the horse. Various changes and modifications of an obvious nature will make themselves apparent to those of ordinary skill in the art, and all such changes and modifications are considered to be within the scope of the invention as defined by the appended claims.

What is claimed is:

1. A horse shoe comprising:
   (a) a resilient curved body having
      (1) an upper surface adapted to receive a horse's hoof;
      (2) resilient tab means projecting upwardly and adapted to clampingly engage an outer surface of a horse's hoof and to position said horse shoe on said hoof;
      (3) said upper surface of said horse shoe and the engaging surface of said tab means adapted to receive a bonding means, with at least said upper surface being provided with a plurality of openings for receiving said bonding means;
   (b) a curved member embedded in said horse shoe comprising a material having a high strength to weight ratio, said openings being aligned with said curved member and passing through said upper surface terminating at an upper surface of said curved member; and,
   (c) a lower surface provided with a plurality of downwardly depending projections, said lower surface further including a downwardly depending gripper portion having a portion of said curved member embedded therein.

2. The horse shoe of claim 1 in which said tab means, said downward depending projections and said downward depending gripper portion are integrally formed with said body.

3. The horse shoe of claim 1 in which said resilient body comprises a hard rubber.

4. The horse shoe of claim 1 in which said resilient body comprises a polyurethane.

5. The horse shoe of claim 1 in which said embedded member comprises a light weight metal or plastic.

6. The horse shoe of claim 5 in which said embedded member comprises aluminum.

7. The horse shoe of claim 1 in which said downwardly depending projections are conically shaped.

8. The horse shoe of claim 1 in which said resilient tab means comprises a forward portion and a pair of side portions.

* * * * *